United States Patent
Bruckner et al.

(10) Patent No.: US 10,681,784 B2
(45) Date of Patent: Jun. 9, 2020

(54) LIGHTING FIXTURE WITH SELECTABLE COLOR TEMPERATURE

(71) Applicant: ABL IP Holding LLC, Atlanta, GA (US)

(72) Inventors: Benjamin Bruckner, Snellville, GA (US); Yan Rodriguez, Suwanee, GA (US)

(73) Assignee: ABL IP Holding LLC, Atlanta, GA (US)

(*) Notice: Subject to any disclaimer, the term of this patent is extended or adjusted under 35 U.S.C. 154(b) by 0 days.

(21) Appl. No.: 16/601,874

(22) Filed: Oct. 15, 2019

(65) Prior Publication Data

US 2020/0045789 A1 Feb. 6, 2020

Related U.S. Application Data

(62) Division of application No. 16/257,823, filed on Jan. 25, 2019.
(Continued)

(51) Int. Cl.
*H05B 33/08* (2020.01)
*H05B 37/02* (2006.01)
(Continued)

(52) U.S. Cl.
CPC ......... *H05B 45/20* (2020.01); *H05B 33/0863* (2013.01); *H05B 45/37* (2020.01); *H05B 47/10* (2020.01)

(58) Field of Classification Search
CPC ............... H05B 33/08; H05B 33/0803; H05B 33/0809; H05B 33/0815; H05B 33/0827;
(Continued)

(56) References Cited

U.S. PATENT DOCUMENTS 6,201,351 B1 3/2001 Rudolph et al.
6,995,355 B2 2/2006 Rains, Jr. et al.
(Continued)

FOREIGN PATENT DOCUMENTS

CN 106555981 4/2017
EP 2768283 8/2014
(Continued)

OTHER PUBLICATIONS

"2×4 LED Flat Panel", Main Place Lighting, Available Online at: https://shopmainplacelighting.com/collections/commercial-lighting/products/2-x-4-led-flat-panel-1, Accessed from Internet at May 14, 2019, 3 pages.
(Continued)

*Primary Examiner* — Thai Pham
(74) *Attorney, Agent, or Firm* — Kilpatrick Townsend & Stockton LLP

(57) ABSTRACT

A lighting fixture for powering multiple LED groups to generate a selectable color temperature. The lighting fixture provides varying amounts of power to each group of LEDs to achieve a selected color temperature. Current from a driver may be divided between the LED groups based on a selected operational state, which is selected using a switch or other configurable input. The operational states may turn the LED groups on or off or may control an amount of current received by the LED groups. In some configurations, all of the LED groups are always at least partially powered.

7 Claims, 6 Drawing Sheets

Related U.S. Application Data

(60) Provisional application No. 62/622,275, filed on Jan. 26, 2018.

(51) Int. Cl.
*H05B 45/20* (2020.01)
*H05B 45/37* (2020.01)
*H05B 47/10* (2020.01)

(58) Field of Classification Search
CPC .............. H05B 33/0842; H05B 33/086; H05B 33/0857; H05B 45/20; H05B 45/37; H05B 47/10; G09G 3/32; G09G 3/34; G09G 3/3406; G09G 3/342
See application file for complete search history.

(56) References Cited

U.S. PATENT DOCUMENTS

| | | |
|---|---|---|
| 7,014,336 B1 | 3/2006 | Ducharme et al. |
| 7,088,059 B2 | 8/2006 | McKinney et al. |
| 7,135,664 B2 | 11/2006 | Vornsand et al. |
| 7,173,383 B2 | 2/2007 | Vornsand et al. |
| 7,329,998 B2 | 2/2008 | Jungwirth |
| 7,416,312 B1 | 8/2008 | McDermott |
| 7,423,387 B2 | 9/2008 | Robinson et al. |
| 7,497,590 B2 | 3/2009 | Rains, Jr. et al. |
| 7,520,634 B2 | 4/2009 | Ducharme et al. |
| 7,883,239 B2 | 2/2011 | Rains, Jr. et al. |
| 8,172,415 B2 | 5/2012 | Wegh et al. |
| 8,203,260 B2 | 6/2012 | Li et al. |
| 8,228,002 B2 | 7/2012 | Newman, Jr. et al. |
| 8,317,362 B2 | 11/2012 | Ku et al. |
| 8,330,378 B2 | 12/2012 | Maehara et al. |
| 8,373,362 B2 | 2/2013 | Chemel et al. |
| 8,436,549 B2 | 5/2013 | Hasnain |
| 8,476,837 B2 | 7/2013 | Vos |
| 8,598,809 B2 | 12/2013 | Negley et al. |
| 8,633,650 B2 | 1/2014 | Sauerlaender |
| 8,638,045 B2 | 1/2014 | Kunst et al. |
| 8,669,722 B2 | 3/2014 | Yeh et al. |
| 8,710,754 B2 | 4/2014 | Baddela et al. |
| 8,791,642 B2 | 7/2014 | van de Ven et al. |
| 8,823,289 B2 | 9/2014 | Linz et al. |
| 8,872,438 B2 | 10/2014 | Zhou et al. |
| 8,878,443 B2 | 11/2014 | Luo et al. |
| 8,890,419 B2 | 11/2014 | Stack |
| 8,890,436 B2 * | 11/2014 | Chou .................... H05B 37/02 315/153 |
| 8,941,312 B2 | 1/2015 | McRae |
| 8,975,823 B2 | 3/2015 | Yang et al. |
| 9,055,647 B2 | 6/2015 | Sutardja et al. |
| 9,072,149 B2 | 6/2015 | Wu et al. |
| 9,125,271 B2 | 9/2015 | Martins et al. |
| 9,144,131 B2 | 9/2015 | Wray |
| 9,210,760 B2 | 12/2015 | Sanders et al. |
| 9,277,607 B2 | 3/2016 | Ramer et al. |
| 9,289,269 B2 | 3/2016 | Valteau et al. |
| 9,301,359 B2 | 3/2016 | Wray |
| 9,374,876 B2 | 6/2016 | Alpert et al. |
| 9,386,653 B2 | 7/2016 | Kuo et al. |
| 9,414,457 B2 | 8/2016 | Fukuda et al. |
| 9,485,826 B2 | 11/2016 | Bohler et al. |
| 9,538,603 B2 | 1/2017 | Shearer et al. |
| 9,538,604 B2 | 1/2017 | Yadav et al. |
| 9,544,951 B1 | 1/2017 | O'Neil et al. |
| 9,544,969 B2 | 1/2017 | Baddela et al. |
| 9,554,441 B2 | 1/2017 | Sutardja et al. |
| 9,560,710 B2 | 1/2017 | Beijer et al. |
| 9,603,213 B1 | 3/2017 | Suttles et al. |
| 9,719,642 B1 | 8/2017 | Macias |
| 9,730,291 B1 | 8/2017 | Janik et al. |
| 9,801,250 B1 | 10/2017 | Halliwell |
| 9,820,350 B2 | 11/2017 | Pyshos et al. |
| 9,844,113 B2 | 12/2017 | Yan et al. |
| 9,892,693 B1 | 2/2018 | Kumar et al. |
| 9,900,945 B1 | 2/2018 | Janik et al. |
| 10,091,855 B2 | 10/2018 | Van Winkle |
| 10,117,300 B2 | 10/2018 | Doheny et al. |
| 10,163,405 B2 | 12/2018 | Kumar et al. |
| 10,290,265 B2 | 5/2019 | Kumar et al. |
| 10,292,233 B1 | 5/2019 | Udavant et al. |
| 10,299,335 B2 | 5/2019 | Pyshos et al. |
| 10,299,336 B2 | 5/2019 | Bowen et al. |
| 10,299,337 B1 | 5/2019 | Chen et al. |
| 10,448,471 B1 | 10/2019 | Chowdhury et al. |
| 2005/0243022 A1 | 11/2005 | Negru |
| 2006/0220586 A1 | 10/2006 | Latham |
| 2006/0226795 A1 | 10/2006 | Walter et al. |
| 2006/0238136 A1 | 10/2006 | Johnson, III et al. |
| 2006/0285310 A1 | 12/2006 | Shyu |
| 2007/0159750 A1 | 7/2007 | Peker et al. |
| 2007/0262724 A1 | 11/2007 | Mednik et al. |
| 2008/0130298 A1 | 6/2008 | Negley et al. |
| 2009/0026913 A1 | 1/2009 | Mrakovich |
| 2009/0218960 A1 | 9/2009 | Lyons et al. |
| 2009/0256483 A1 | 10/2009 | Gehman et al. |
| 2010/0141175 A1 | 6/2010 | Hasnain et al. |
| 2010/0207534 A1 | 8/2010 | Dowling et al. |
| 2010/0283322 A1 * | 11/2010 | Wibben ................ H02M 3/158 307/31 |
| 2010/0308738 A1 | 12/2010 | Shteynberg et al. |
| 2011/0058372 A1 | 3/2011 | Lerman et al. |
| 2011/0068702 A1 | 3/2011 | van de Ven et al. |
| 2011/0084615 A1 | 4/2011 | Welten |
| 2011/0115407 A1 | 5/2011 | Wibben et al. |
| 2012/0080944 A1 | 4/2012 | Recker et al. |
| 2012/0081009 A1 | 4/2012 | Shteynberg et al. |
| 2012/0098460 A1 | 4/2012 | Miyasaka et al. |
| 2012/0242247 A1 | 9/2012 | Hartmann et al. |
| 2012/0286753 A1 | 11/2012 | Zhong et al. |
| 2013/0002167 A1 | 1/2013 | Van de Ven |
| 2013/0038222 A1 * | 2/2013 | Yeh .................... H05B 33/0824 315/152 |
| 2013/0140988 A1 | 6/2013 | Maxik et al. |
| 2013/0141013 A1 | 6/2013 | Kodama et al. |
| 2013/0200806 A1 | 8/2013 | Chobot |
| 2013/0229125 A1 | 9/2013 | Yan et al. |
| 2013/0249422 A1 | 9/2013 | Kerstens et al. |
| 2013/0343052 A1 | 12/2013 | Yen |
| 2014/0035472 A1 | 2/2014 | Raj et al. |
| 2014/0197750 A1 | 7/2014 | Cash |
| 2014/0210357 A1 | 7/2014 | Yan et al. |
| 2014/0210364 A1 | 7/2014 | Cash et al. |
| 2014/0252967 A1 | 9/2014 | van de Ven et al. |
| 2014/0312777 A1 | 10/2014 | Shearer et al. |
| 2015/0009666 A1 | 1/2015 | Keng et al. |
| 2015/0351169 A1 | 12/2015 | Pope et al. |
| 2015/0359061 A1 | 12/2015 | Adler |
| 2016/0007420 A1 * | 1/2016 | Gong .................. H05B 33/0815 315/187 |
| 2016/0128155 A1 | 5/2016 | Petluri et al. |
| 2016/0363308 A1 | 12/2016 | Shum |
| 2016/0366746 A1 | 12/2016 | van de Ven et al. |
| 2016/0374177 A1 | 12/2016 | Chen |
| 2017/0019973 A1 | 1/2017 | Beck et al. |
| 2017/0027033 A1 * | 1/2017 | Chobot ............. H05B 33/0827 |
| 2017/0086265 A1 | 3/2017 | Akiyama et al. |
| 2017/0086280 A1 | 3/2017 | Boomgaarden et al. |
| 2017/0135186 A1 | 5/2017 | O'Neil et al. |
| 2017/0164440 A1 | 6/2017 | Hu et al. |
| 2017/0238392 A1 | 8/2017 | Shearer et al. |
| 2017/0303363 A1 | 10/2017 | Pyshos et al. |
| 2018/0035510 A1 | 2/2018 | Doheny et al. |
| 2018/0116029 A1 | 4/2018 | Pyshos et al. |
| 2018/0166026 A1 | 6/2018 | Kumar et al. |
| 2018/0310381 A1 | 10/2018 | Bowen et al. |
| 2018/0368232 A1 | 12/2018 | Doheny et al. |
| 2019/0027099 A1 | 1/2019 | Kumar et al. |

(56) References Cited

U.S. PATENT DOCUMENTS

2019/0037663 A1    1/2019  Van Winkle
2019/0088213 A1    3/2019  Kumar et al.

FOREIGN PATENT DOCUMENTS

| EP | 2728972 | 8/2015 |
| JP | 2011258517 | 12/2011 |
| WO | 2011084135 | 7/2011 |

OTHER PUBLICATIONS

"38W LED Panel—Color Selectable", Venture Lighting, Available Online at: https://www.venturelighting.com/led-lighting/indoor-lighting-fixtures/panels-and-troffers/color-selectable-panels/standard-product/pn38592.html, Mar. 19, 2019, 9 pages.

"Easy Lighting Control", Application Guide, OSRAM, Available Online at: www.osram.com/easy, Apr. 2015, 25 pages.

"Human Centric Lighting", Helvar, Intelligent Colour Product Series, Available Online at: https://www.helvar.com/media/filer_public/91/04/9104b3d6-392b-461a-aa48-dd073d33c76b/hcl_flyer-brochure.pdf, Dec. 4, 2017, 4 pages.

"IW Cove MX Powercore-Premium Interior Linear LED Cove and Accent Luminaire with Intelligent White Light", Philips Lighting, Product Family Leafelet, Nov. 20, 2017, 3 pages.

"LED Panel 1230 40W Colour Changeable", Fuzion Lighting, Information sheet, Available online at: http://www.fuzionlighting.com.au/product/led-panel-40-cct, Mar. 19, 2019, 6 pages.

"LED Universal Ceiling Fan Light Kit", Hampton Bay, Use and Care Guide, Nov. 7, 2019, 22 pages.

"LLP LED Light Panel", Main Place Lighting, Specification Sheet, Available Online at: https://cdn.shopify.com/s/files/1/2048/2207/files/LLP-Specification-Sheet-1.pdf, Mar. 19, 2019, 4 pages.

"Noble Pro LED Line Voltage Task Lighting NLLP Series", AFX, Available Online at: www.AFXinc.com, Accessed from Internet at May 13, 2019, 1 page.

"Par Lite Led", VariWhite, Coemar, User Manual Version 1.0, Jun. 2011, 19 pages.

"ViaCon LED—Products", Trilux Simplify your Light, Available Online at: https://www.trilux.com/en/products/viacon-led/, Accessed from Internet at May 13, 2019, 11 pages.

U.S. Appl. No. 16/257,823 , "Ex Parte Quayle Action", Oct. 4, 2019, 6 pages.

* cited by examiner

LIGHTING FIXTURE WITH SELECTABLE COLOR TEMPERATURE

RELATED APPLICATION

This application is a divisional patent application of U.S. Ser. No. 16/257,823, filed Jan. 25, 2019, entitled Lighting Fixture with Selectable Color Temperature, which claims priority to a provisional application entitled Lighting Fixture with Selectable Color Temperature, U.S. Ser. No. 62/622,275, which are incorporated by reference herein in their entirety.

TECHNICAL FIELD

This disclosure relates generally to the field of lighting fixtures. More specifically, this disclosure relates to controlling power to multiple groups of LEDs to produce different color temperatures using a single fixture.

BACKGROUND

Lighting fixtures can produce different color temperatures of white light to suit the preferences of different consumers or activities. For example, a cool white light may be preferred by some consumers or appropriate for some activities, whereas a warm white light may be preferred by other consumers or appropriate for other activities. In some instances, different light fixtures are required to provide light with different color temperatures.

SUMMARY

The present invention is directed to systems and methods for selecting a color temperature by controlling the power provided to multiple groups of LEDs. Each group of LEDs may individually provide light at a different color temperature. A lighting system may provide varying amounts of power to each group of LEDs to achieve a selected color temperature.

In some examples, the fixture may use a single driver output or current source to power all of the LED groups in the lighting fixture. The current is divided between the LED groups based on a selected operational state. The operational state may be selected using a switch or other configurable input. The operational states may turn the LED groups on or off or may control an amount of current received by the LED groups. In some configurations, all of the LED groups are always at least partially powered. In some examples, a multi-channel driver is used. In those cases, each LED group is connected to a different channel.

In some examples, the LED groups are controlled to provide discrete color temperature points, i.e., stepped control, and in other examples, the LED groups are controlled to provide a continuous range of color temperatures, i.e., continuous control.

These and other aspects of the invention will be described in more detail and in the accompanying figures.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
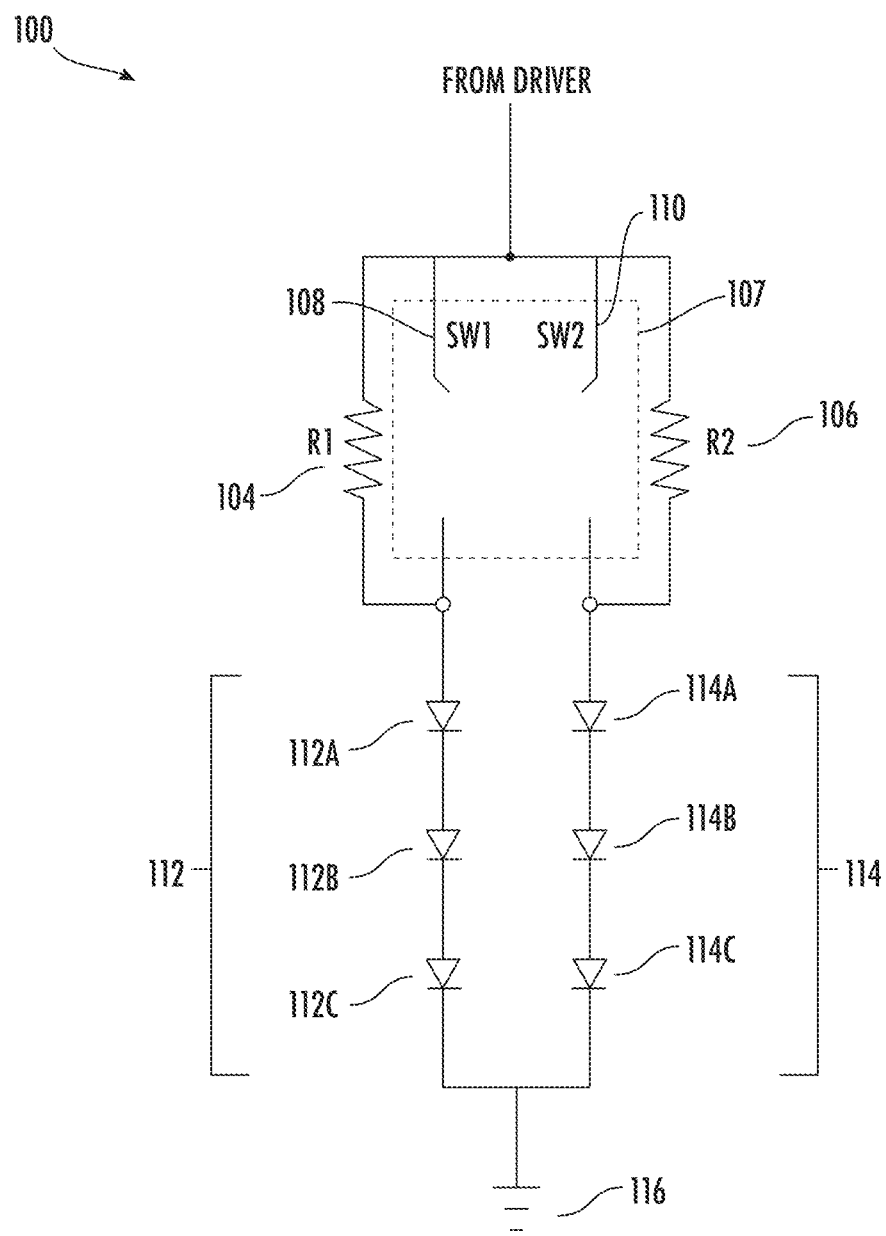
FIG. 1 depicts an example of a circuit for controlling LED groups using bleed resistors, according to the present disclosure.

Briefly described, the present disclosure generally relates to a lighting fixture that controls current to multiple LED groups to produce different color temperatures. The fixture controls current to each of the LED groups so that the fixture produces light with a color temperature that corresponds to the color temperature of one of the LED groups or a color temperature that corresponds to a combination of the color temperatures of multiple LED groups.

In some configurations, the fixture may use a single driver output or current source to power all of the LED groups in the lighting fixture. A selected operational state determines how the current is divided between the LED groups. A switch or other configurable input selects the operational state. In one configuration, the fixture provides a first amount of current to an LED group so that the LED group is fully or almost fully powered and produces light at or near its full intensity, and provides a second amount of current, which is smaller than the first amount of current, to another LED group so that the other LED group is partially powered and produces light at less than its full intensity. In this configuration, the current provided to each LED group is based on the state of a switchable path between the driver and the LED group and a bleed resistor connected in parallel to the switchable path. In this configuration, the fixture provides light at color temperatures between the color temperatures of the individual LED groups.

In another configuration, the fixture provides current to one of the multiple LED groups so that one LED group is powered at a time. A switch or other input selects which one of the LED groups is powered. In this configuration, the fixture provides light at color temperatures that correspond to the color temperature of the individual LED groups.

In another configuration, the fixture divides the current to the LED groups based on a potentiometer. A current control circuit is connected to each LED group and controls the amount of current to its LED group based on the value of the output of the potentiometer. The fixture provides light at color temperatures that correspond to the color temperatures of each of the LED groups, as well as color temperatures between the color temperatures of the LED groups.

In other configurations, the fixture may use a multi-channel driver or multiple current sources to power the LED groups so that each LED group is connected to a different channel or current source. A switching device controls the driver channels or current sources to control the current provided to the LED groups. The fixture may provide light at color temperatures between the color temperatures of the individual LED groups.

An LED group may include multiple LEDs. The LEDs in an LED group may be connected in series, in parallel, or in any combination thereof. Individual LEDs in an LED group may have the same color temperature or may have different color temperatures. The number of LEDs in an LED group may differ between LED groups within the same lighting fixture. When the LED group is powered, the LEDs collectively provide light at a color temperature. The disclosure is also applicable to lighting fixtures that use other types of lighting elements including, but not limited to, OLEDs.

Fixture with Bleed Resistors

Referring now to the figures, FIG. 1 depicts an example of a circuit for controlling two LED groups that includes bleed resistors, according to the present disclosure. A circuit 100 controls multiple groups of LEDs. The circuit 100 is connected to an output of a driver (not shown) and a ground or a driver return 116. The circuit 100 includes a first bleed resistor 104 and a second bleed resistor 106. The first bleed resistor 104 is connected between the driver output and the first group of LEDs and the second bleed resistor 106 is connected between the driver output and the second group of LEDs. The bleed resistors may have the same value or different values. In one example, both of the bleed resistors are 1K Ohms.

Each LED group contains a plurality of LEDs, such as LEDs 112A, 112B, 112C, collectively referred to as the "first LED group" 112, or LEDs 114A, 114B, 114C, collectively referred to as the "second LED group" 114. The first LED group 112 may include a number of LEDs 112A, 112B, and 112C that collectively produce light with a color temperature of 2700K. The second LED group 114 may include a number of LEDs 114A, 114B, and 114C that collectively produce light with a color temperature of 5000K. Color temperatures of 5000K and above are generally considered "cool colors", and color temperatures between 2000K-3000K are generally considered "warm colors".

The output of the driver is connected to the first bleed resistor 104, the second bleed resistor 106, and a switching device 107. FIG. 1 illustrates that the switching device has two switches and that the first switch 108 is parallel to the first bleed resistor 104 and the second switch 110 is parallel to the second bleed resistor. Other configurations for the switching device are also possible. The switching device provides a switchable path between the output of the driver and each of the LED groups. The switching device may enable operational states that produce light at a selectable color temperature. The On-Off switching of the fixture and any dimming control is provided by another controller or circuit, which is not shown in FIG. 1. The dimming control can, in some configurations, be provided by a constant current driver that varies the total current supplied to the LED groups. Dimming is provided by controlling the amount of current provided by the driver. The proportion of the current provided to each LED group is the same for all intensities In a first exemplary state, the first switch 108 is open and the second switch 110 is closed so that the second LED group 114 is connected to the driver output via closed second switch 110 and the second bleed resistor 106. The circuit 100 provides a first amount of current to LED group 114 and a second amount of current to LED group 112. The first amount of current is greater than the second amount of current. The second amount of current is sufficient to partially power LED group 112 so that it produces light. The first LED group 112 is connected to the driver output only via the first bleed resistor 104 since the first switch 108 is open. The combination of the more fully powered LED group 114 and the partially powered LED group 112 generates light with a color temperature with a measurable and perceptible color temperature shift from 5000K.

For example, assume the driver produces 9 W of power and LED groups 112 and 114 each have enough 3V LED's to create LED strings of 27V each. The resultant current output under this configuration will be 333 mA (27 multiplied by 0.333 equals 9). If the partially powered LED group 112 has a bleed resistor set at 818 ohms then the resultant current traveling through the string will be 33 mA (27 divided by 818 equals 0.033). Given that the driver is of a constant current configuration at 333 mA and that partially powered LED group 112 is consuming 33 mA then the more fully powered LED group 114 will receive around 300 mA of current. This will result in a 90:10 distribution of current between partially powered LED group 112 and more fully powered LED group 114. Assuming LED group 112 and LED group 114 are populated with LEDs with efficacies of 200 lumens per watt then a singular LED in the more fully powered LED group 114 will produce around 60 Lumens (200 multiplied by 0.3 equals 60) while an LED in partially powered LED group 112 will produce 6.6 lumens (200 multiplied by 0.033 equals 6.6). Given that light of different colors and intensities mix to form new combined colors those skilled in the art may appreciate that a color temperature shift occurs when partially powered LED group 112 produces light at 2700K and more fully powered LED group 114 produces light at 5000K. At a 90:10 ratio 90% of the light will be at 5000K and 10% of the light will be at 2700K. The color temperature difference between the two is 2300 (5000 minus 2700 equals 2300). Ten percent (10%) of 2300 is 230 so the resultant color temperature will be 4770K (5000-230). These values are a first approximation. Other ratios of currents may also be used and the current may be divided between more than two LED groups.

When there are two LED groups, the ratio of the light output by one of the LED groups to the light output by the other LED group may fall in a range from 96:4 to 60:40. Typically, a color temperature shift above 100K is perceptible by the human eye, so some implementations shift the color temperature by between 4% and 40%. There are also more precise formulas to determine the exact shift based on the xy values of the LED color as measured under the CIR 1931 chromaticity chart.

In a second exemplary state, the first switch 108 is closed and the second switch 110 is open. First LED group 112 is connected to the driver output via closed first switch 108 and the first bleed resistor 104. The circuit 100 provides a first amount of current to LED group 112 and a second amount of current to LED group 114. The first amount of current is greater than the second amount of current. The second amount of current is sufficient to partially power LED group 114 so that it produces light. LED group 114 is connected to the driver output only via the second bleed resistor 106 since the second switch 110 is open. The combination of the more fully powered LED group 112 and the partially powered LED group 114 generates light with a color temperature with a measurable and perceptible color temperature shift from 2700K.

In a third exemplary state, the first switch 108 is closed and the second switch 110 is closed. The circuit 100 provides current to LED group 112 and to LED group 114 to more equally power both LED groups. In some situations, the amount of current provided to the LED groups is substantially the same. The combination of the outputs of LED group 112 and LED group 114 generates light with a color temperature between 5000K and 2700K.

A fourth exemplary state is optional and depending on the driver configuration may not be practical. In this state, the first switch 108 is open and the second switch 110 is open. LED group 112 is connected to the driver output via first bleed resistor 104 and LED group 114 is connected to the driver output via the second bleed resistor 106. In some situations, the amount of current provided to the LED groups is substantially the same in this state but lower than in the previous states. The combination of the powered LED group 112 and the powered LED group 114 generates light with a color temperature between 5000K and 2700K.

Figure 2:
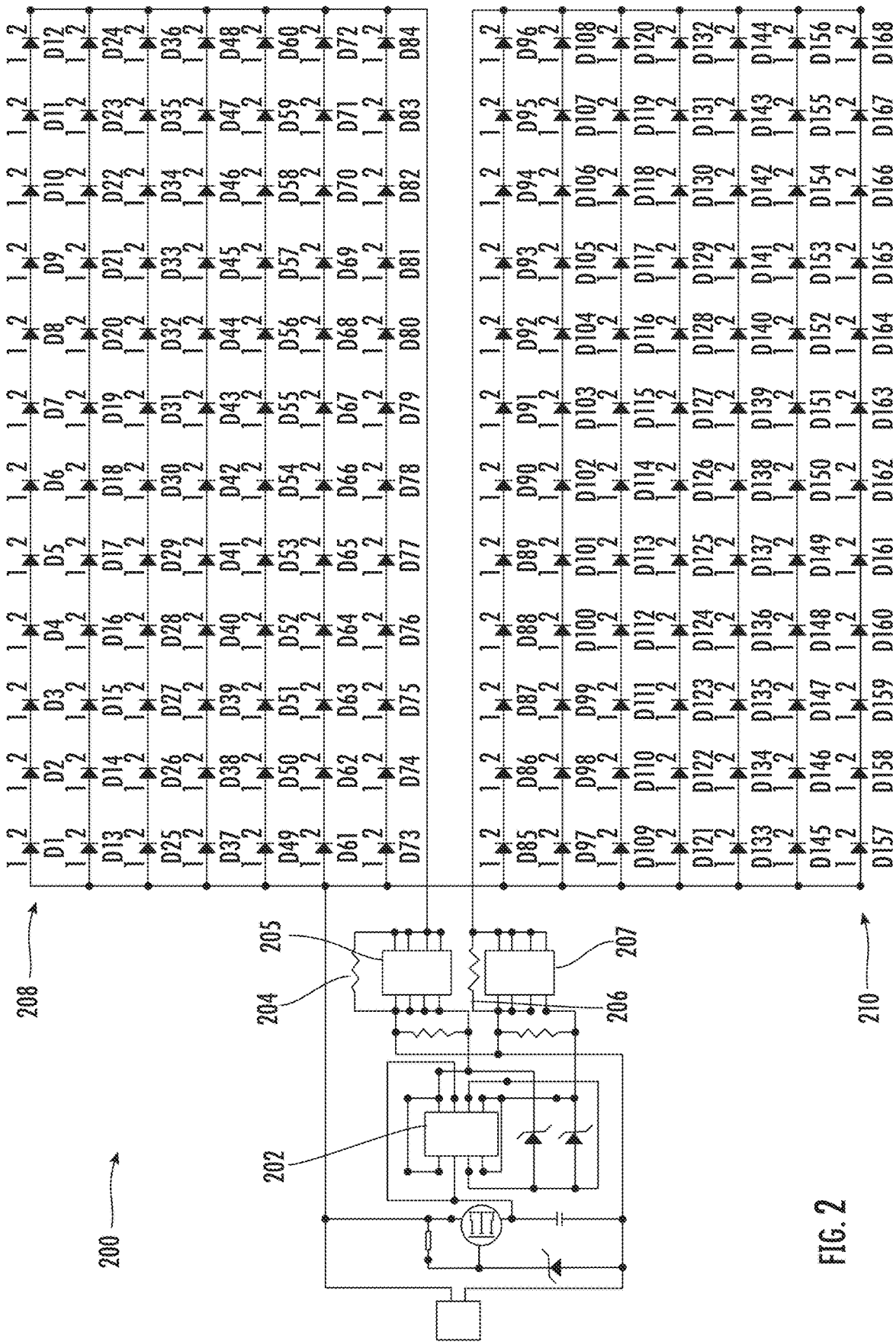
FIG. 2 depicts an example of a circuit for controlling LED groups using bleed resistors, according to the present disclosure.

FIG. 2 depicts another example of a circuit that uses bleed resistors. In this example, the circuit includes a controller 202 that controls two switches 205 and 207. A first bleed resistor 204 is connected in parallel with the first switch 205 and a second bleed resistor 206 is connected in parallel with the second switch 207. The first bleed resistor 204 and the first switch 205 are connected to a first LED group 208. The second bleed resistor 206 and the second switch 207 are connected to the second LED group 210. The controller controls the switches to provide operating states similar to those described above in connection with FIG. 1.

Although FIGS. 1 and 2 illustrate two groups of LEDs, other examples may use three or more groups of LEDs and may control the groups of LEDs so that at least one of the groups of LEDs is connected to the output of a driver through a closed switch and its respective bleed resistor and at least one of remaining groups of LEDs is connected to the output of the driver only via its respective bleed resistor.

Fixture with Multi-Channel Driver

Figure 3A:
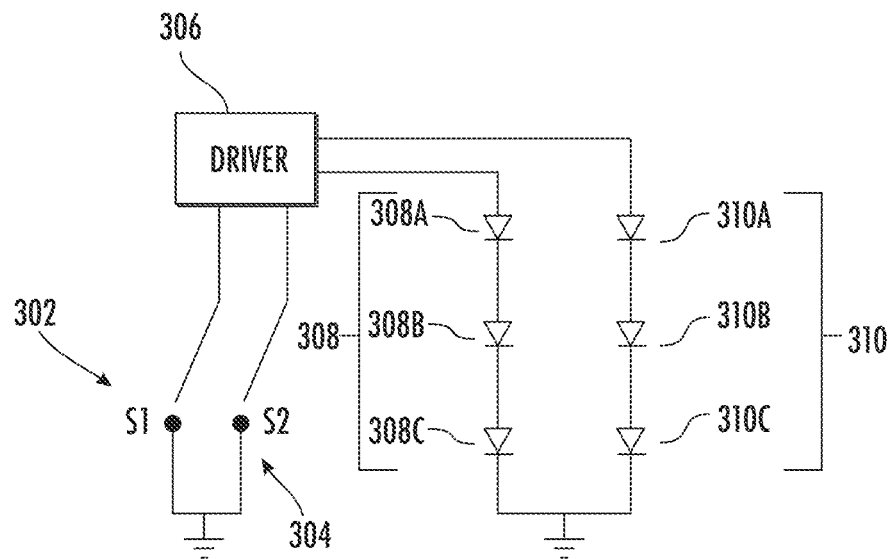
FIG. 3A depicts an example of a circuit for controlling LED groups using a multi-channel driver, according to the present disclosure.

In other examples, the fixture uses a driver with multiple output channels. FIG. 3A depicts an example of a circuit for controlling LED groups using a multi-channel driver, according to the present disclosure. The multi-channel driver 306 has a first channel connected to first LED group 308 with LEDs 308A-308C, and a second channel connected to second LED group 310 with LEDs 310A-310C. The multi-channel driver 306 additionally has a switching device connected to inputs of the driver. In FIG. 3A, the switching device includes a first switch 302 and a second switch 304 and each switch is connected to an input of the driver. The positions of the first switch 302 and the second switch 304 control the inputs of the driver and accordingly the state of the output channels. The multi-channel driver 306 may be configured to provide a pre-programmed current on each channel based on a setting of the first switch 302 and the second switch 304.

Figure 3B:
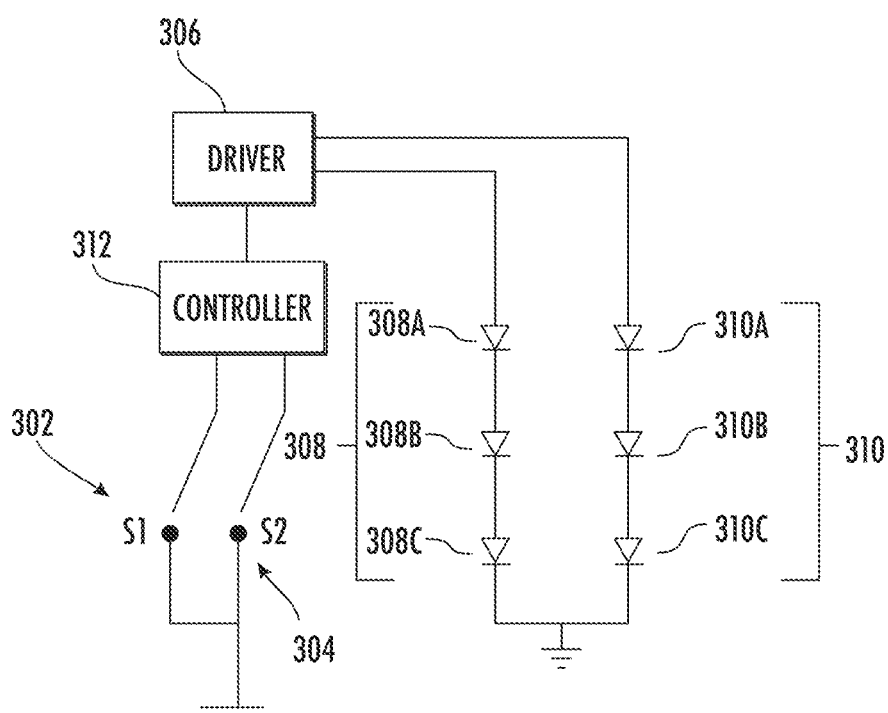
FIG. 3B depicts an example of a circuit for controlling LED groups using a multi-channel driver, according to the present disclosure.

FIG. 3B depicts another example of a circuit for controlling LED groups using a multi-channel driver, according to the present disclosure. The multi-channel driver 306 has a first channel connected to a first LED group 308 with LEDs 308A-308C, and a second channel connected to a second LED group 310 with LEDs 310A-310C. A switching device is connected to an input of the driver. In FIG. 3B the switching device includes a controller 312, a first switch 302, and a second switch 304. The positions of the first switch 302 and the second switch 304 control inputs of the controller and are used to determine the input to the driver. The driver controls the state of the output channels based on the input. The multi-channel driver 306 may be configured to provide a pre-programmed current on each channel based on the output of the controller 312.

In one configuration, the first LED group 308 is connected to a first channel of the multi-channel driver 306 and the second LED group 310 is connected to a second channel of the multi-channel driver 306. The driver in FIG. 3A or the combination of the driver and the controller in FIG. 3B may be configured so that the driver provides a pre-programmed amount of output current based on the state of the switching device that contains the first switch (S1) and the second switch (S2). In this example, the multi-channel driver 306 provides 1000 mA of output current divided between two output channels (i.e., Channel 1 and Channel 2) as shown in Table 1 below.

TABLE 1

| S1 | S2 | Channel 1 | Channel 2 | Color Temperature Channel 1 | Color Temperature Channel 2 | Resulting Color Temperature |
|---|---|---|---|---|---|---|
| On | Off | 900 mA | 100 mA | 5000 K | 2700 K | 4770 K |
| Off | On | 100 mA | 900 mA | 5000 K | 2700 K | 2930 K |
| On | On | 500 mA | 500 mA | 5000 K | 2700 K | 3850 K |

As shown in Table 1, the switching device containing the first switch and the second switch has at least three potential states, each state based on a particular configuration of the switches. As previously described, in states where at least one of the first switch or second switch is in a "closed/on" position, both channel 1 and channel 2 are at least partially powered. In a state with both the first switch and the second switch in "closed/on" positions, the current provided by the multi-channel driver 306 is split between channel 1 and channel 2. Although Table 1 shows that the current is split evenly between channel 1 and channel 2 when both switches are in the "closed/on" positions and that the same current levels are provided on each channel, other divisions of current are also possible. For example, the output levels for channel 1 may differ from the output levels for channel 2. If the fixture provides a state where both switches are allowed to be in the "open/off" state, then the driver may not provide current to either channel or may provide current according to a fourth predefined state. Although Table 1 illustrates that the switching device includes two switches, the switching device may provide three states using a different number of switches or different types of components.

Fixture with Single Selector

Figure 4:
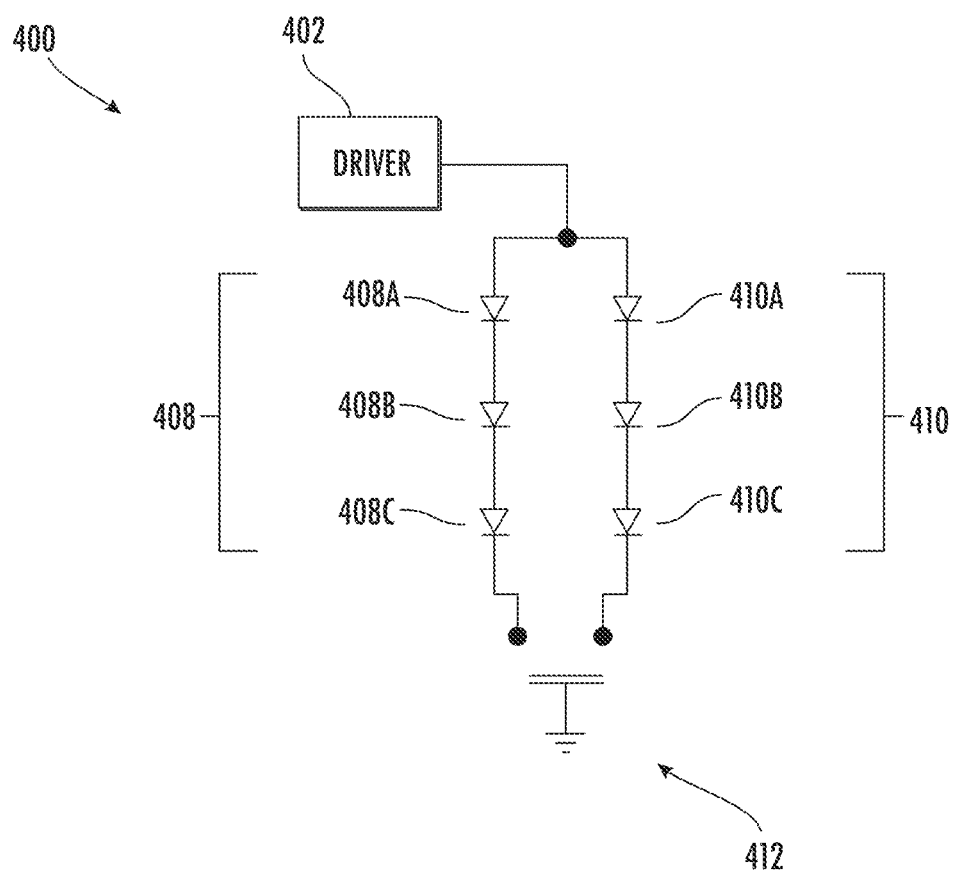
FIG. 4 depicts an example of a circuit for controlling LED group using a single selector switch, according to the present disclosure.

Other types of switching devices may be used to select one LED group from multiple LED groups so that only one LED group is powered at a time. FIG. 4 depicts an example of a circuit 400 with multiple LED groups, an LED driver, and a switching device. In this example, the output of the LED driver 402 is selectively connected to LED group 408 with LEDs 408A-408C or to LED group 410 with LEDs 410A-410C based on the state of switching device 412. The switching device may be a single selector switch. In one example, LED group 408 may produce light with a color temperature of 5000K and LED group 410 may produce light with a color temperature of 2700K. The LED driver 402 provides output to LED group 408 or LED group 410 based on the setting of the single selector switch 412 as shown in Table 2 below.

TABLE 2

| Switch | LED group 408 | LED group 410 |
|---|---|---|
| Position 1 | 800 mA | 0 mA |
| Position 2 | 0 mA | 800 mA |

In this configuration, the single selector switch 412 controls which one of the LED groups receive power from the LED driver 402. The single selector switch 504 may have more than the two positions shown in Table 2 and if so, then both LED groups will be off in the additional positions.

In an alternative or additional configuration, the circuit 400 may include more than two LED groups. In an example using three LED groups, the LED groups may provide light at color temperatures of 5000K, 4000K, and 2700K respectively. In this configuration, the single selector switch 412 controls which one of the LED groups receive power from the LED driver 402. The circuit 400 provides one of the LED groups receiving power based on the position of the single selector switch 504 with the other LED groups not receiving power from the LED driver 402.

Fixture with Potentiometer

Figure 5:
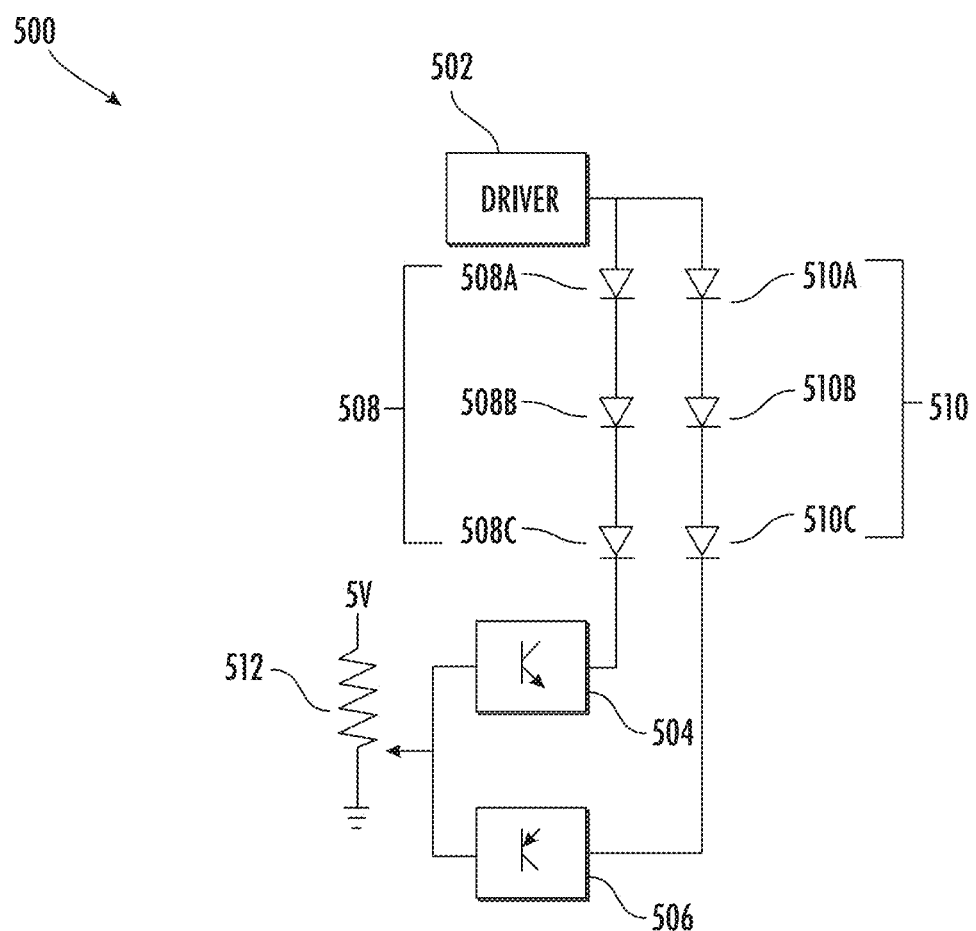
FIG. 5 depicts an example of a circuit for controlling LED groups using a potentiometer, according to the present disclosure.

In other examples, a potentiometer may be used to control the color temperature by controlling current through the LED groups. FIG. 5 illustrates an exemplary circuit for controlling LED groups using a potentiometer, according to the present disclosure. In this example, the output of the LED driver 502 is connected to a first LED group 508 with LEDs 508A-508C and a second LED group 510 with LEDs 510A-510C). The circuit 500 controls power provided to the first LED group 508 and second LED group 510 based on the output of a potentiometer 512. A first current control circuit 504 is connected to the first LED group and the potentiometer 512. A second current control circuit 506 is connected to the second LED group and the potentiometer 512. The potentiometer 512 controls the first current circuit 504 and the second current control circuit 506 based on the output of the potentiometer.

In one configuration, the potentiometer provides a voltage signal which varies between 0-5V and which may be connected to a pulse width modulation (PWM) circuit. The PWM in turn drives a MOSFET-type of transistor. The transistors are then wired in series with each LED Group. In this configuration as the pulse width varies from 0% to 100% the resultant current flowing through the first LED group will vary from 0% to 100%. A second PWM circuit connected in reverse to the second LED group will result in the resultant current flowing through the second LED group to vary from 100% to 0%. This will result in the desired behavior between the two LED groups.

In another embodiment, FETs may be connected in series with each of the LED groups. In this scenario, the potentiometer provides a varying voltage to the FET controller that in turn drives each FET in the linear region. This configuration makes the FETs act like a current controller to each LED group. By connecting each FET in reverse configuration, LED group 1 will see a rise in current when the potentiometer transitions from 0 to 5 V while LED group 2 will see a decrease in current when the potentiometer transitions from 0-5V.

In another embodiment, step functions may be provided by either the FET's or the MOSFET circuits by only allowing the output of the PWM to change when a particular voltage is output by the potentiometer. As an example, 0-2V may vary the CCT change on a 90:10 ratio while 2-4V may vary the CCT in a 50:50 ratio. The same can be done with the linear FET circuit by providing hysteresis to the circuit driving the linear FET's.

In one configuration, the circuit 500 provides stepped control based on the output of the potentiometer. Stepped control allows selection of certain predetermined color temperatures. The first current control circuit 504 and the second current control circuit 506 each include transistors that provide a switching function and turn the first LED group 508 and the second LED group 510 on and off as shown below in Table 3. Table 3 illustrates a fixture with three possible color temperature selections.

TABLE 3

| Potentiometer Output | Transistor 1 | Transistor 2 | LED Group 508 | LED Group 510 |
| --- | --- | --- | --- | --- |
| 0 V | Off | On | Off | On |
| 1.5-3.5 V | On | On | On | On |
| 3.6-5 V | On | Off | On | Off |

In another configuration, the circuit 500 provides continuous control based on the output of the potentiometer. Continuous control allows selection of a range of color temperatures between the color temperatures of each individual LED group. The current control circuits in this configuration slowly shift the current and provide continuous control of the color temperature produced by the combination of the first LED group 508 and the second LED group 510. The color temperature may vary in continuous values of color temperature as the current varies as shown in FIG. 6.

Figure 6:
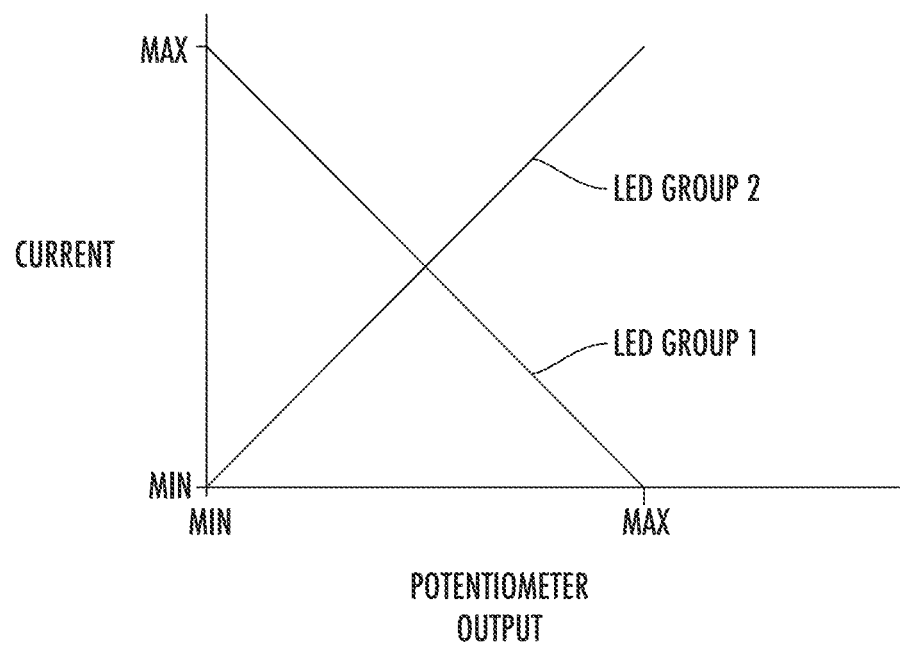
FIG. 6 depicts an example of current levels for LED groups, according to the present disclosure.

FIG. 6 illustrates that when the potentiometer output is at its minimum value, e.g., 0V, that LED group 1, i.e., LED group 508, receives no or a minimum level of current and LED group 2, i.e., LED group 510 receives a maximum level of current. As the potentiometer output increases from its minimum value, the amount of current received by the first LED group increases and the amount of current received by the second LED group decreases. The first LED group and the second LED group may both be partially powered, but may receive different amounts of current based on the output of the potentiometer. When the potentiometer output is at its maximum value, e.g., 5V, LED group 1 receives the maximum level of current and LED group 2 receives no or a minimum level of current.

Some fixtures may include a potentiometer with detents to assist in the selection of the color temperature. For example, when a first detent of the potentiometer is engaged, the fixture may generate a first predetermined color temperature that is a combination of the color temperatures of two or more LED group and when a second detent of the potentiometer is engaged, the fixture may generate a second predetermined color temperature that is a different from the first and is a different combination of the color temperatures of two or more LED groups.

General Considerations

The color temperatures, number of LED groups, number and arrangements of LEDs in an LED group, and currents used in the above examples are exemplary. Other implementations may use different values, numbers, or arrangements and may use other types of lighting elements. The fixture may be any type of a fixture, including a linear fixture, a downlight, or a flush mount fixture. The LEDs of the different LED groups may be arranged so that the LEDs from different groups are interspersed in the fixture or may be arranged so that LEDs from different groups are separated in the fixture. Other light characteristics other than color temperature may also be changed or controlled.

A switching device may use any type of component or combination of components to provide the described states or switching functions. A switching device may include any type of mechanical, electrical, or software switch and a switch may be controlled or set directly or indirectly. A switch may be controlled by a user or by another component that is either part of the fixture or remote from the fixture.

Although the foregoing describes exemplary implementations, other implementations are possible. It will be appreciated that those skilled in the art, upon attaining an understanding of the foregoing, may readily produce alterations to, variations of, and equivalents to the described aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

What is claimed is:

1. A lighting fixture, comprising:
   a driver for powering a first LED group and a second LED group, the driver having a driver output;
   a potentiometer;
   a first current control circuit connected to an output of the potentiometer;
   a second current control circuit connected to the output of the potentiometer;
   the first LED group configured to produce light at a first color temperature, wherein the first LED group is connected to the driver output and to the first current control circuit; and
   the second LED group configured to produce light at a second color temperature, which is different than the first color temperature, wherein the second LED group is connected to the driver output and to the second current control circuit,
   wherein the output of the potentiometer controls the first current control circuit and the second current control circuit to divide current provided by the driver output into a first portion provided to the first LED group and a second portion provided to the second LED group, and wherein the output of the potentiometer controls the first current control circuit and the second current control circuit so that:
   when the output of the potentiometer is at a minimum value, the current provided by the driver output is divided so that current to the first LED group is a first maximum current and current to the second LED group is a second minimum current,
   when the output of the potentiometer is at a maximum value, the current provided by the driver output is divided so that current to the first LED group is a first minimum current and current to the second LED group is a second maximum current, and
   when the output of the potentiometer is between the minimum value and the maximum value, the current provided by the driver output is divided so that the current to the first LED group is between the first maximum current and the first minimum current and the current to the second LED group is between the second minimum current and the second maximum current.

2. The lighting fixture of claim 1, wherein the first current control circuit includes a first transistor and the second current control circuit includes a second transistor, and the output of the potentiometer controls the first current control circuit and the second current control circuit by switching the first transistor and the second transistor.

3. The lighting fixture of claim 2, wherein when the output of the potentiometer is within a first output range, the first transistor is off and the second transistor is on and the current provided by the driver output is provided to the second LED group, when the output of the potentiometer is within a second output range, the first transistor is on and the second transistor is on and the current provided by the driver output is divided between the first LED group and the second LED group, and when the output of the potentiometer is within a third output range, the first transistor is on and the second transistor is off and the current provided by the driver output is provided to the first LED group.

4. The lighting fixture of claim 1, wherein the current to the first LED group is inversely proportional to the current to the second LED group.

5. The lighting fixture of claim 1, wherein the first minimum current illuminates the first LED group and the second minimum current illuminates the second LED group.

6. The lighting fixture of claim 1, wherein the lighting fixture produces light having a range of color temperatures only between the first color temperature and the second color temperature.

7. The lighting fixture of claim 1, further comprising circuitry connected to an input of the driver for controlling the driver to control an intensity of light produced by the lighting fixture by controlling an amount of current provided by the driver output.

* * * * *